Patented Apr. 26, 1949

2,468,056

UNITED STATES PATENT OFFICE 2,468,056

ABRASIVE ARTICLES AND METHOD OF MANUFACTURING THE SAME

George J. Goepfert, Niagara Falls, and Norman P. Robie, Lewiston, N. Y., assignors to The Carborundum Company, Niagara Falls, N. Y., a corporation of Delaware No Drawing. Application October 24, 1944, Serial No. 560,196

9 Claims. (Cl. 51—298)

This invention relates to abrasive articles and method of manufacturing the same. More specifically, it is directed to abrasive articles in which the bond contains as an essential ingredient a substantial proportion of the hardened reaction product of a urea resin and furfuryl alcohol. These bonds are adapted for use in the manufacture of cast or molded abrasive articles as represented by grinding wheels and sharpening stones, but are particularly well suited for use as the binder for attaching abrasive grains to a backing in the manufacture of coated abrasives of the type commonly referred to as "sandpaper."

Urea resins are commonly prepared by reacting a mixture of urea and formaldehyde. The initial reaction product is commonly obtained as an aqueous solution or suspension containing, for example, about 60% solids, hereinafter referred to as "an aqueous dispersion of a urea-formaldehyde condensation product." When such a solution or suspension is spread out in the form of a film and heated, preferably in the presence of a catalyst, which may be either an acid or an alkali, the film obtained is hard and glassy. However, upon being exposed to the air for a few days or weeks, depending upon the atmospheric conditions, the film cracks and checks. If such unmodified resin is used as the adhesive for attaching abrasive grains to a backing in making sandpaper, the abrasive coating is firmly held when the products are first made but, upon standing, reaches a condition such that it may be very easily removed, and such products are useless for abrading purposes.

The urea resins are relatively inexpensive. They can be converted into an infusible insoluble condition where they are strong and resinous by the application of relatively low heat, as by heating for a few hours at 125-225° F. Phenol-aldehyde resins as typified by the product commonly known as "Bakelite" are strong and make satisfactory bonds for abrasives but they require a relatively prolonged heat treatment at somewhat higher temperatures up to about 300° F. They are also more expensive than the urea resins. The development of a urea resin which would retain the strength and resinous characteristics obtained when the resins are first cured has therefore been a goal much to be desired.

We have discovered that the difficulties experienced with films of urea resins which have been described above may be obviated by incorporating with the aqueous suspension of the initial reaction products of urea and aldehyde, a suitable proportion of furfuryl alcohol. The amount of furfuryl alcohol which is added to make the films resistant to the atmosphere and to prevent the checking and cracking of the unmodified resins depends somewhat upon the amount of accelerator which is used to hasten the curing of the resin. In general, if the amount of accelerator is increased, the quantity of furfuryl alcohol should also be increased.

We have further found that a still additional improvement may be made in coated abrasives using the furfuryl alcohol modified urea resins as the binder if inert fillers are also included in the liquid adhesive. The fillers not only improve the quality of the finished article in some cases but they have two additional advantages. When a filler is added to the liquid adhesive the viscosity of the coating composition is increased and this is often desirable, particularly when coarse grid products are made and it is necessary to apply relatively thick films of the adhesive. The fillers are also relatively inexpensive and consequently when they are used the cost of the articles is reduced. The fillers may be either organic or inorganic. Fillers which we have used and found to be satisfactory include pulverized walnut shell flour, cryolite, flint, and some kinds of clays.

It is accordingly an object of the invention to make improved abrasive articles of the coated abrasive type in which a urea resin is employed as an essential constituent of the binder. Another object of the invention is to provide coated abrasive articles and the method of making the same in which abrasive grains are attached to a backing by a binder comprising the hardened reaction product of a urea resin, such as a urea-formaldehyde condensation product, and furfuryl alcohol as the essential ingredients. A still further object of the invention is to provide coated abrasive articles and a method of making such articles wherein abrasive grains are attached to a backing by a binder formed by drying and heating an aqueous suspension of a urea-formaldehyde resin admixed with furfuryl alcohol, an inert filler, and a catalyst to accelerate the curing of the resin.

In making coated abrasive articles it is customary to first coat the backing, such as paper or cloth, with a film of liquid adhesive and, while the adhesive is still liquid and retentive, to apply a coating of abrasive grains. Usually the grains are put onto the backing in excess and the articles are then inverted to remove the unattached grains. The grains may be applied by dropping them from a suitable hopper or, alternatively, they may be projected against the adhesive coated side of the backing by a so-called "electrostatic deposition." This latter method is illustrated in a number of patents, such as U. S. Patent No. 2,187,624, issued January 14, 1940.

Following the application of the abrasive grains, the abrasive coated backing, which is commonly provided in the form of a web of quite considerable length, is treated to solidify the adhesive. Where the adhesive is applied as an aqueous suspension this may be done by drying at slightly elevated temperatures to remove the water. In the present invention, heat sufficient to cause the urea resin to react and become infusible and insoluble may or may not be applied at this stage.

After the first or so-called "making" coat of adhesive has been dried or solidified, the coated backings are commonly given a second or so-called "sizing" coat by applying a liquid adhesive over the tops of the abrasive grains. This sizing coat provides additional binder for the finished article and helps to attach the grains firmly to the backing.

After the sizing coat has been applied it is also treated to remove the water and further treated to complete the reaction needed to make the resin infusible and insoluble. This may be accomplished by heat-treating for a substantial length of time at a suitable temperature, the time and temperature required being determined somewhat by the quantity of catalyst or accelerator which has been incorporated in the adhesive mix.

Instead of using the furfuryl alcohol modified urea resin for both the making and the sizing coat, we have sometimes found it to be advantageous to use a different adhesive for one or the other of these coats. For example, the making coat may be hide glue, which is the adhesive which has been used for many years for making the ordinary kind of coated abrasive, the sizing coat being the modified urea resin. Similarly, a phenol-aldehyde resin may be used for either the make or the size coating and the modified urea resin for the other coat.

We will now describe our invention by reference to a number of specific examples, it being understood that the examples are for illustrative purposes only and are not limitative.

*Example I*

Abrasive discs were made by coating the cloth side of a backing consisting of a layer of cloth filled with resin and adhesively attached to a sheet of vulcanized fiber by applying 17–19 lbs. of wet adhesive per sandpapermaker's ream of 480 sheets 9" x 11" to the backing as a making coat followed by coating with an excess of 24 grit fused alumina abrasive grain. The coated backings were inverted to remove the excess grain not adhesively attached. This left 93 lbs. per ream of abrasive grain. The making coat was solidified by drying for 15 minutes at 150° F. The making coat was prepared by mixing 450 grams of water, 440 grams of an accelerator designated herein as "A," and 400 grams of furfuryl alcohol with 4000 grams of an aqueous suspension of urea-formaldehyde resin containing 80% solids and consisting of the initial reaction product of urea and formaldehyde.

A sizing coat was made by diluting 100 parts of the making coat with 10 parts of water, and after the making coat had been dried as described, 30–35 lbs. per ream of the sizing coat were applied over the abrasive grain. The article was then dried and cured by heating according to the following schedule:

| | |
|---|---:|
| 1 hour at | °F__ 125 |
| 1 hour at | °F__ 150 |
| 1 hour at | °F__ 175 |
| 1 hour at | °F__ 200 |
| 2 hours at | °F__ 225 |

Accelerator A was an ammoniacal solution containing approximately 20% of a mixture of ammonium thiocyanate and thiourea in the ratio of 9 parts of the thiocyanate to 1 part of thiourea.

The abrasive discs as prepared were tested on a standard testing machine and removed 169 grams of steel with a loss of 2 grams of material from the disc surface. The test was continued for a period of 12 minutes. By way of comparison discs made with the same resin and accelerator but without the furfuryl alcohol were completely useless after abrading for only 3 minutes on the same testing machine.

*Example II*

Discs were made as described in Example I except that the making coat contained the following ingredients:

| | Grams |
|---|---:|
| Urea resin of Example I | 4,000 |
| Water | 750 |
| Accelerator A | 490 |
| Furfuryl alcohol | 400 |
| 200 mesh walnut shell flour | 620 |

Discs made according to this example, when tested in the manner described with respect to Example I, removed 158 grams of steel with a loss of 2.6 grams of coating.

*Example III*

Discs were made as in the preceding example except that the making adhesive was of the following composition:

| | Grams |
|---|---:|
| Urea resin of Example I | 4,000 |
| Water | 700 |
| Accelerator A | 440 |
| Furfuryl alcohol | 400 |
| 200 mesh and finer cryolite | 1,780 |

These discs, when tested as described above, removed 191 grams of steel with a loss of 3 grams of coating.

*Example IV*

Abrasive discs were made on a backing similar to that employed in the preceding examples except that the cloth was not pre-filled with resin. The making coat employed was a high grade of hide glue and was used in an amount to leave 8 lbs. per ream of air-dried glue. The sizing coat was made from a commercial resin which is similar to the resin of Example I except that it contains only 60% solids. The composition of the sizing coat was as follows:

| | Grams |
|---|---:|
| Resin | 4,000 |
| Accelerator A | 400 |
| Furfuryl alcohol | 400 |
| 200 mesh walnut shell flour | 800 |

30–35 lbs. per ream, wet weight, of size was applied.

The coated material was cured as described in Example I. Discs cut therefrom, when tested manually under conditions simulating those which prevail in one of the most severe grinding operations for which such discs are used, removed 244 grams of steel with a loss of 15.3 grams. Additional discs from this lot were retested six months later and removed 250 grams of steel with a disc loss of 7.0 grams.

Example V

Abrasive paper suitable for the manufacture of belts to be used in woodworking were made with a glue making coat, 100 grit fused alumina abrasive grains, and a furfuryl alcohol modified urea resin size. The sizing coat was of the following composition:

| | Grams |
|---|---|
| Resin of Example IV | 2,000 |
| Accelerator A | 200 |
| Furfuryl alcohol | 150 |

The belt material was cured by gradually raising the temperature up to 225° F. in 6 hours and holding at that temperature for 2 hours. Abrasive belts made from this material, when used in a standard testing machine for 1 hour, removed 2129 grams of hard maple. A standard glue bonded woodworking belt of the same grit size produced and sold commercially by The Carborundum Company under the same conditions of test removed 1750 grams of wood.

Example VI

Abrasive wheels were made by preparing a bond mixture containing, by weight:

| | Parts |
|---|---|
| Resin of Example IV | 100 |
| Accelerator A | 10 |
| Furfuryl alcohol | 10 |
| Pulverized flint | 53 |

This bond mixture was then thoroughly stirred up with 80 grit fused alumina grain in the ratio of 20 parts of the bond mixture to 80 parts of abrasive grain and the mixture was placed in a mold, pressed under a pressure of 2000 lbs. per square inch and dried for 24 hours at room temperature and cured for 6 hours at 225° F. The resulting product was then finished and provided with a lead bushing in the usual manner.

While the ultimate test as to whether or not a particular adhesive is satisfactory as an abrasive bond should be made by making abrasive articles, it is possible to obtain an opinion as to the possible suitability of a particular adhesive by making any of several tests. One such test consists in making castings of the adhesive solutions as by filling a mold about 1½ inches in diameter by ⅛-inch deep with the liquid adhesive, drying, and curing. These castings may then be set aside and examined from time to time to determine whether or not they crack or check or, alternatively, they may be artificially aged as by heating for 80–120 hours at 225°–250° F.

The improvement obtained by modifying urea resins with various addition agents was studied by this method and it was found that when 100 parts by weight of the resin of Example IV were mixed with 10 parts by weight of the accelerator A and cured for 16 hours at 125° F., followed by 6 hours at 175° F., the castings were all shattered by the time the resin was cured. However, castings made from a similar mix to which had been added various quantities ranging from 7–10 parts by weight of furfuryl alcohol were all perfect and have remained so for about eight months. Such castings were also not in the least affected by the accelerated aging test of heating for 120 hours at 225° F.

Similarly, satisfactory results were obtained by adding to the furfuryl alcohol-urea resin mixes described just above, inert fillers such as pulverized walnut shell flour, cryolite, and flint. Castings made with the fillers without the furfuryl alcohol all shattered during the curing of the resin.

Results comparable to those just described with respect to the resin of Example IV were also obtained when castings were made from mixtures containing 10 parts furfuryl alcohol, 10 parts of the accelerator A and 100 parts of a resin prepared as follows:

270 grams of an aqueous solution of formaldehyde containing 40% formaldehyde was heated under reflux to boiling. To the boiling mixture was added 60 grams of urea dissolved in 30 grams of hot water. The reaction mixture was stirred and heated in an oil bath at 100–105° C. for 2 hours. The product obtained was then filtered and dehydrated under a vacuum to a solids content of 65%.

Other accelerators besides the ammoniacal solution of sodium thiocyanate and thiourea designated as accelerator A may be employed. That particular accelerator solution is alkaline, having a pH of 8.1, but when admixed with the urea resin the pH is reduced to 5.4, which is on the acid side. Other accelerators which may be employed and which are of themselves acid in solution are ammonium sulfate, aluminum sulfate, aluminum chloride, and ferric chloride. A 20% solution of ammonium thiocyanate and ammonia, which is of itself alkaline, may also be used.

The amount of furfuryl alcohol which is required to make satisfactory products is dependent, among other things, upon the amount of accelerator. The effect of varying the amount of modifier and the amount of catalyst was studied by making a series of castings of mixtures of the resin of Example IV, various amounts of accelerator A, and various amounts of furfuryl alcohol. Where only 4 grams of accelerator were used to 100 grams of the resin solution, as little as 4 grams of the furfuryl alcohol were needed to make perfect castings. On the other hand, when the amount of accelerator was increased to 10 grams, a minimum of 6 grams of the furfuryl alcohol was needed to make perfect castings. If less than this quantity was used the castings broke up into large pieces during the cure. The proportion of furfuryl alcohol to the resin solution should lie in the range of 4–15 parts to 100 parts of solution. Since the solution contains 60% solids the ratio is therefore in the approximate range of 7–25 parts of furfuryl alcohol to 100 parts of the urea resin solids.

Another method of determining the effect of modifying the urea resin with the furfuryl alcohol consists in making abrasive briquettes and testing their tensile strength. Such a study was made using 20% of resin mixture with 80% 80 grit fused alumina abrasive grain and curing for 4 hours at 200° F. after allowing to stand 16 hours at room temperature. The resin used was the resin of Example IV and the accelerator was accelerator A. In every case 10 grams of the accelerator was used with 100 grams of the resin in the preparation of the resin mixture.

Briquettes bonded with such mixture and with various fillers and without the use of furfuryl alcohol ranged in strengths from 153 to 409 pounds per square inch. Those made with the same mixes except that 10 parts furfuryl alcohol were added ranged in strengths from 1102 to 1378 pounds per square inch.

The reasons why the furfuryl alcohol modifier improves the urea resin bond are not understood, but there is evidence that the furfuryl alcohol chemically reacts with the resin and/or accelerator and possibly also to some extent with itself to form a different type of resin. Furfuryl alcohol has a boiling point of about 170° C. and a substantial vapor pressure at the temperatures at which the abrasive mixes and test pieces described above were cured.

In order to study this question, castings were made from weighed amounts of mixes containing, in the one case, approximately 100 grams of urea resin of Example IV and 10 grams of the accelerator A, and in the other the same basic mix to which had been added 9 grams of furfuryl alcohol. The mixes were cured for 21 hours at 150° F., followed by 6 hours at 220° F., and the cured castings weighed. It was found that the mix which did not contain the furfuryl alcohol had lost 36% as a result of the cure whereas the mix containing the furfuryl alcohol had lost only 31.5%. This seems to indicate that the furfuryl alcohol not only does not volatilize but actually reacts since the loss is actually less than in the case where no furfuryl alcohol was used.

We have described the invention by reference to a number of specific examples and have included data on various tests to illustrate the effect of using the furfuryl alcohol, either alone or along with fillers. In addition, other modifications of the invention may be practiced. For example, furfuryl alcohol may be admixed with the reactants at any stage of the process when the urea formaldehyde resin is being made instead of being added to the aqueous suspension of the initial reaction products as has been described herein. We may also use other kinds of resins such as those prepared with other aldehydes or with modified ureas such as thiourea, which are herein referred to along with urea as "a urea." Instead of refluxing the urea compound with the aldehyde we may employ aqueous solutions of compounds which react to form resins, such as dimethylol urea. Likewise, other fillers or mixtures of fillers may be used and the proportions of abrasive grain and binder and the heat treatments used to bring about reaction may be varied. For that matter, if sufficient accelerator is employed it is unnecessary to heat the articles as the binder will eventually cure to the infusible insoluble condition at ordinary room temperatures if sufficient time is allowed.

It is to be understood, therefore, that the invention is not restricted to the specific modifications and embodiments described herein but, rather, is to be given the scope defined in the appended claims.

We claim:

1. An abrasive article comprising abrasive grains and a binder therefor containing as an essential ingredient and as the primary bonding material a substantial proportion of the acid-catalyzed reaction product of a urea-formaldehyde condensation product with furfuryl alcohol, the ratio of furfuryl alcohol to condensation products being in the range of 7–25 to 100.

2. A coated abrasive article comprising a backing having abrasive grains attached thereto by a hardened binder containing as an essential ingredient and as the primary bonding material a substantial proportion of the acid-catalyzed reaction product of a urea-formaldehyde condensation product with furfuryl alcohol, the ratio of furfuryl alcohol to condensation products being in the range of 7–25 to 100.

3. A coated abrasive article comprising a backing having a layer of abrasive grains attached to a surface thereof by a binder containing as an essential ingredient and as the primary bonding material a substantial proportion of the dried and hardened furfuryl alcohol-urea resin reaction product of a mixture comprising about 7–25 parts furfuryl alcohol to about 100 parts of the solids of an aqueous dispersion of a urea-formaldehyde condensation product containing about 60–80% solids and a sufficient quantity of an acid catalyst to make the pH of the mixture in the range of about 3–5.5.

4. A coated abrasive article comprising a backing having a layer of abrasive grains attached to a surface thereof by a binder containing as an essential ingredient and as the primary bonding material a substantial proportion of the dried and hardened furfuryl alcohol-urea resin reaction product of a mixture comprising 100 parts of an aqueous dispersion of a urea-formaldehyde condensation product containing about 60% solids, about 7–10 parts of furfuryl alcohol, an inert filler in a quantity to provide from about 20 to about 40 parts by volume to filler to each 60 parts of the hardened urea resin, and a sufficient quantity of an acid catalyst to make the pH of the mixture in the range of about 3–5.5.

5. An abrasive article comprising abrasive grains and a binder therefor containing as an essential ingredient and as the primary bonding material a substantial proportion of the acid-catalyzed reaction product of a urea, an aldehyde and furfuryl alcohol, the furfuryl alcohol being present in the proportion of about 4–15 parts to each 60 parts of urea and aldehyde and being substantially all reacted with the urea-aldehyde condensation product which is formed by the reaction of the urea with the aldehyde.

6. The method of making abrasive articles which comprises bonding abrasive grains with a binder containing as essential ingredients an acid catalyst and as the primary bonding material substantial proportions of an aqueous dispersion of a urea-formaldehyde condensation product and furfuryl alcohol, and heating the article thus formed to solidify the bond and bring about a reaction between the urea-formaldehyde condensation product and the furfuryl alcohol, the ratio of furfuryl alcohol to condensation products being in the range of 7–25 to 100.

7. A coated abrasive article comprising a backing having a layer of abrasive grains attached to a surface thereof by a binder containing as an essential ingredient and as the primary bonding material a substantial proportion of the dried and hardened acid-catalyzed reaction product of furfuryl alcohol with the solids of an aqueous dispersion of a urea-formaldehyde condensation product, the ratio of furfuryl alcohol to the solids of the aqueous suspension being about 7–25 to 100.

8. The method of making coated abrasives which comprises coating a backing with abrasive grains and a liquid binder containing as essential ingredients an acid catalyst and as the primary bonding material substantial proportions of an aqueous dispersion of a urea-formaldehyde condensation product and furfuryl alcohol, removing the water, and causing the condensation product to react with the furfuryl alcohol and form a substantially infusible insoluble bond which does not crack or check upon continued exposure to the air, the ratio of furfuryl alcohol to condensation product solids being in the range of 7–25 to 100.

9. A coated abrasive article comprising a backing having a layer of abrasive grains attached thereto by a glue making coat, and a sizing coat over the making coat containing as an essential ingredient and as the primary bonding material of the sizing coat a substantial proportion of the acid-catalyzed reaction product of a urea-formaldehyde condensation product with furfuryl alcohol, the ratio of furfuryl alcohol to condensation products being in the range of 7–25 to 100.

GEORGE J. GOEPFERT.
NORMAN P. ROBIE.

REFERENCES CITED

The following references are of record in the file of this patent:

UNITED STATES PATENTS

| Number | Name | Date |
|---|---|---|
| 1,833,715 | Klingspor | Nov. 24, 1931 |
| 1,900,386 | Kuzmick | Mar. 7, 1933 |
| 1,907,088 | Novotny | May 2, 1933 |
| 1,909,784 | Novotny | May 16, 1933 |
| 1,924,748 | Novotny | Aug. 29, 1933 |
| 2,061,931 | Benner | Nov. 24, 1936 |
| 2,306,924 | Zerweck | Dec. 29, 1942 |
| 2,334,526 | Allison | Nov. 16, 1943 |
| 2,335,701 | Root | Nov. 30, 1943 |
| 2,343,973 | Harvey | Mar. 14, 1944 |
| 2,350,861 | Argy et al. | June 6, 1944 |
| 2,398,224 | Hackett | Apr. 9, 1946 |
| 2,399,055 | Norlander | Apr. 23, 1946 |

FOREIGN PATENTS

| Number | Country | Date |
|---|---|---|
| 756,564 | France | Sept. 25, 1933 |
| 503,542 | Great Britain | Apr. 11, 1939 |

Certificate of Correction

Patent No. 2,468,056. April 26, 1949.

GEORGE J. GOEPFERT ET AL.

It is hereby certified that errors appear in the printed specification of the above numbered patent requiring correction as follows:

Column 1, line 2, for the word "method" read *methods*; column 2, line 20, for "grid" read *grit*; column 8, line 27, for "to" before "filler" read *of*;

and that the said Letters Patent should be read with these corrections therein that the same may conform to the record of the case in the Patent Office.

Signed and sealed this 27th day of September, A. D. 1949.

[SEAL]

THOMAS F. MURPHY,
*Assistant Commissioner of Patents.*